United States Patent [19]
Kikkawa et al.

[11] Patent Number: 6,099,331
[45] Date of Patent: *Aug. 8, 2000

[54] RELAYING DEVICE BETWEEN RELATIVELY ROTATABLE MEMBERS

[75] Inventors: Tomoyoshi Kikkawa; Hiromi Masuda, both of Shizuoka-ken, Japan

[73] Assignee: Yazaki Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/061,891

[22] Filed: Apr. 17, 1998

[30] Foreign Application Priority Data

Apr. 18, 1997 [JP] Japan .................................. 9-101961

[51] Int. Cl.⁷ .................................................. H01R 3/00
[52] U.S. Cl. ............................................. 439/164; 439/15
[58] Field of Search ................................ 439/13, 15, 16, 439/20–28, 164, 29; 174/88 R

[56] References Cited

U.S. PATENT DOCUMENTS

| 4,844,359 | 7/1989 | Kato ........................................ 242/54 |
| 5,562,466 | 10/1996 | Kato et al. ............................. 439/164 |

FOREIGN PATENT DOCUMENTS 3-55688  5/1991  Japan .

*Primary Examiner*—Gary F. Paumen
*Assistant Examiner*—Ross Gushi
*Attorney, Agent, or Firm*—Finnegan, Henderson, Farabow, Garrett & Dunner, L.L.P.

[57] ABSTRACT

A relaying device between relatively rotatable members for carrying out an electric connection between two relatively rotatable members via a cable is disclosed. In this relaying device, a first rotary unit having an inside cylindrical section, a second rotary unit having a relationship of making a relative rotation with respect to the first rotary unit by surrounding the Inside cylindrical section of the first rotary unit, and a cable for electrically connecting between the first rotary unit side and the second rotary unit side are provided. The inside cylindrical section is provided with a groove section for introducing the cable between an outer peripheral surface of the inside cylindrical section and an inner peripheral surface of the inside cylindrical section from the outer peripheral surface side and for guiding out the cable from one end of the inside cylindrical section in its axial direction along the axial direction, and at least the section of the cable extending out from the groove section is divided into groups, each having a predetermined number of conductors with a smaller width, by slits extending in a longitudinal direction of the cable.

8 Claims, 4 Drawing Sheets

RELAYING DEVICE BETWEEN RELATIVELY ROTATABLE MEMBERS

This is a continued prosecution application.

BACKGROUND OF THE INVENTION

1. Field of the Invention

The present invention relates to a device for carrying out an electric connection between two relatively rotatable members via a cable.

2. Description of the Related Art

Various structures have so far been proposed with respect to a relaying device for carrying out an electric connection between two relatively rotatable members via a cable.

As an example of this kind of relaying device between relatively rotatable members, there is one that is structured to include a rotary unit (hereinafter to be referred to as a first rotary unit) having an inside cylindrical section and a fixed unit (hereinafter to be referred to as a second rotary unit) that surrounds the inside cylindrical section of this rotary unit so that the first rotary unit makes a relative rotation, and the rotary unit side and the fixed unit side are electrically connected via a flexible flat cable (hereinafter to be referred to as a cable).

In the above structure, there are cases where the first rotary unit has a disc-shaped upper cover, provided at one end of the inside cylindrical section, that extends outwards in its radial direction. In this case, the cable is bent on one end and is drawn to the outside through a hole provided on the upper cover, and each conductor of the cable is connected to a suitable terminal.

Further, there has also been proposed a structure in which a bus bar is connected to each conductor at one end of the cable and a terminal is connected to the bus bar. In this case, the area surrounding the bus bar may be filled with a resin.

In the above-described relaying device between relatively rotatable members, when the number of circuits increases and the width of the cable correspondingly increases, the following problems occur:

First, since the width of the cable itself is large, it becomes extremely difficult to bend the cable.

Second, when the bus bar is used, for example, since the width of the cable is large, a connection section connected to the upper cover of the first rotary unit must also have a large width, and it becomes difficult to draw the cable to the outside through the hole in the first rotary unit, especially because the upper cover typically has an R-shaped hole, since the upper cover is disc-shaped. In such a situation, there are cases where the bus bar itself is required to have a very complex shape, for example, an R-shape, along the hole.

Further, when the bus bar is used as described above, since the width of the cable itself is large, the connector is also required to have a large width, which makes it difficult to lay out the connector in the upper cover. In this case, the problems of the layout may be addressed if the connector has a two-row terminal, for example. However, the bus bar is then required to have a very complex shape in order to have such a two-row layout.

SUMMARY OF THE INVENTION

To overcome the above-described problems, it is an object of the present invention to provide a relaying device between relatively rotatable members which makes it possible to have a high degree of freedom in bending a cable even in the case where the number of circuits to be used is increased and when, as a result, the cable has a large width.

In order to achieve the above object, a relaying device for relatively rotatable members of the present invention comprises a first rotary unit having an inside cylindrical section, a second rotary unit that rotates with respect to the first rotary unit by surrounding the inside cylindrical section of the first rotary unit, and a cable for electrically connecting the first rotary unit side and the second rotary unit side. Here, the cable consists of a wide and flat material having a plurality of conductors. The inside cylindrical section is provided with a groove section for introducing the cable between the outer peripheral surface of the inside cylindrical section and the inner peripheral surface of the inside cylindrical section from a side of the outer peripheral surface and for guiding out the cable, along an axial direction of the inside cylindrical section, from one end of the inside cylindrical section in the axial direction. At least a section of the cable extending out from said groove section is divided into groups, each having a predetermined number of conductors. The cable is divided into smaller widths by slits extending in a longitudinal direction of the cable.

According to the above-described structure, since at least the section of the cable extending out from the groove section is divided, by slits, into groups, each having a predetermined number of conductors, the cable can be bent easily for each divided small-width cable.

Accordingly, even if the bus bar, for example, is disposed in each conductor of the cable, since the bus bar can be structured in a straight line shape, the shape can be simplified. Further, since the number of conductors is limited in each small-width cable, a complex layout of arranging the bus bar, such as in two rows, is not required.

Further, since the cable can be bent easily for each small-width cable divided by slits, even if a bus bar, for example, is disposed in each conductor of the cable to form a connector using such a bus bar as a terminal, this becomes a connector for each small-width cable and never becomes a large-width connector.

Therefore, when an upper cover, for example, is provided in a rotary unit, the connector can be laid out easily on this upper cover, and thus it is unnecessary for the connector to have a complex shape, such as a shape for accommodating two rows of terminals.

In this case, more specifically, since each divided small-width cable is bent toward the outside in a radial direction with respect to the inside cylindrical section, a connector to be connected to each small-width cable can be laid out in a radial shape. Therefore, the whole structure of the relaying device between relatively rotatable members and the connector can be made smaller.

When a bus bar is connected to the conductor of each divided small-width cable, this bus bar can be used as a terminal of the connector.

Further, each divided small-width cable may be bent toward the outside in the radial direction with respect to the inside cylindrical section and may further be bent along an axial direction of the inside cylindrical section at the outside of this bending in the radial direction, and in this case, an electric wire can also be connected to the conductor of each divided small-width cable.

Then, when a cover unit extending to the outside in its radial direction is provided and a connector housing section corresponding to each divided small-width cable is provided on this cover unit, a radial layout can be made efficiently.

Further, each divided small-width cable can be introduced easily even in the case where the groove section of the inside cylindrical section has an arc shape.

DETAILED DESCRIPTION OF THE PREFERRED EMBODIMENTS

There will be detailed below the preferred embodiments of the present invention with reference to the accompanying drawings. At first, a first embodiment of the present invention will be explained with reference to FIGS. 1–3.

Figure 1:
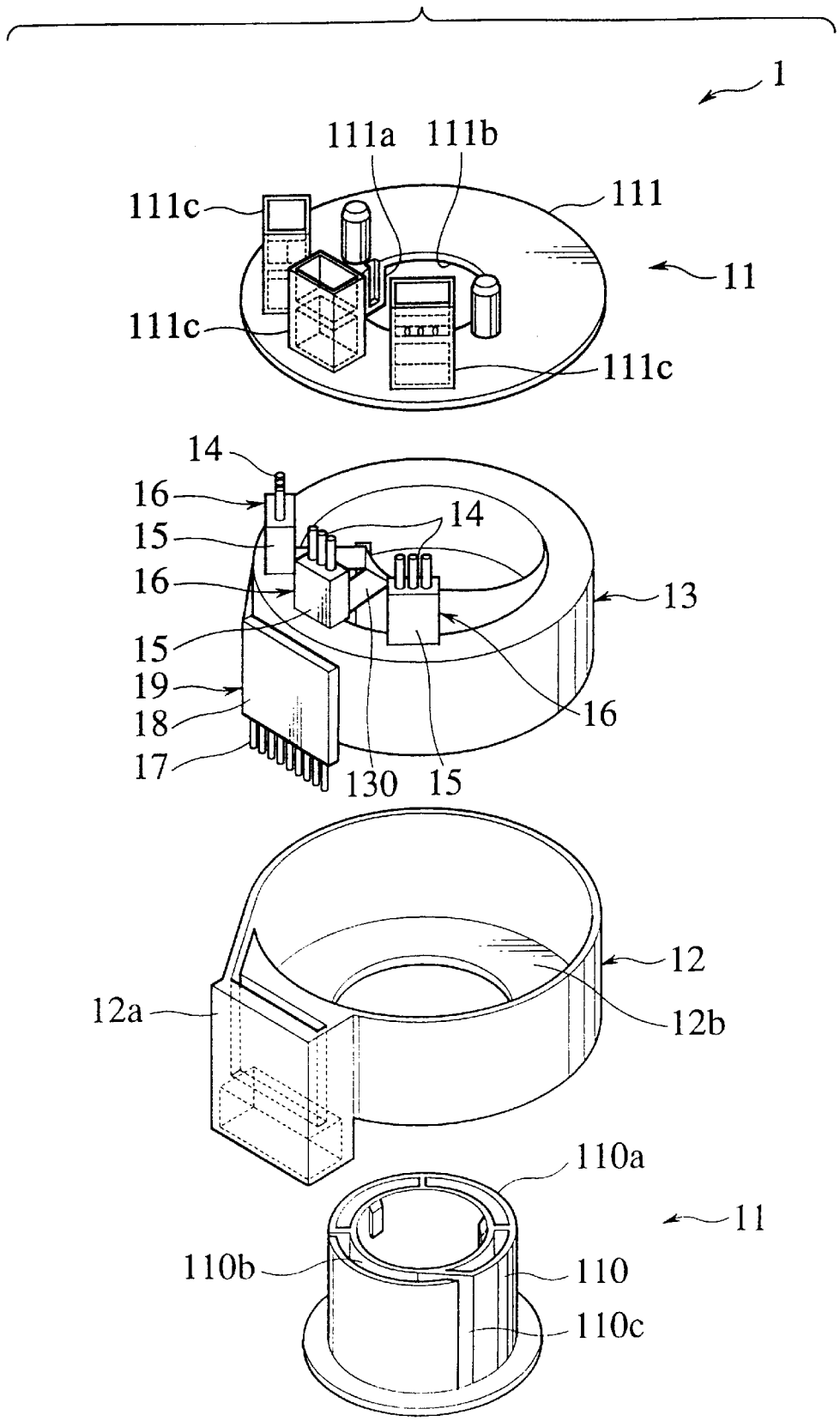
FIG. 1 is a breakdown perspective view of a relaying device for relatively rotatable members shown as a first embodiment of the present invention.

In FIG. 1, numeral 1 denotes a relaying device between relatively rotatable members. In the relaying device between relatively rotatable members 1 shown in FIG. 1, a first rotary unit 11, a second rotary unit 12 (hereinafter, it is assumed that the first rotary unit actually rotates and the second rotary unit is fixed, so that for convenience, the first rotary unit will be called a rotary unit and the second rotary unit will be called a fixed unit), and a flexible flat cable 13 (hereinafter to be called a cable), are respectively provided.

More specifically, in the device, the rotary unit 11 has an inside cylindrical section 110 and the fixed unit 12 is disposed in such a manner that it surrounds the inside cylindrical section 110 of the rotary unit 11. The rotary unit 11 and the fixed unit 12 can rotate relatively, and the rotary unit 11 and the fixed unit 12 are electrically connected through the cable 13.

In the rotary unit 11, a disc-shaped upper cover 111, which is a cover unit extending to the outside in its radial direction, is connected to one end section 110a of the inside cylindrical section 110. More specifically, these are connected together by an engagement claw 111a of the upper cover 111.

A groove 110b is formed in the inside cylindrical section 110. This groove 110b is formed between the outer periphery surface and the inner peripheral surface of the inside cylindrical section 110 and has an arc shape along the outer peripheral surface and the inner peripheral surface. On the outer peripheral surface of the inside cylindrical section 110, an entrance section 110c for guiding the cable 13 into the groove 110b is formed.

Figure 2:
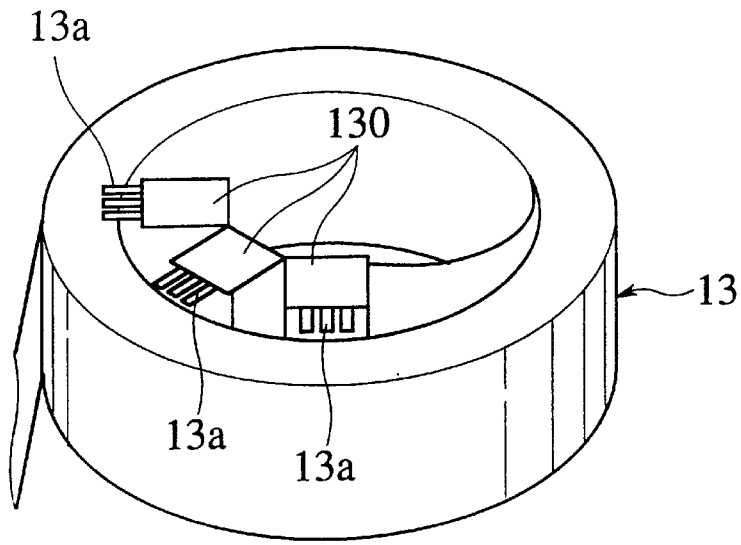
FIG. 2 is a perspective view for showing a cable of the relaying device for relatively rotatable members of the first embodiment.
Figure 3:
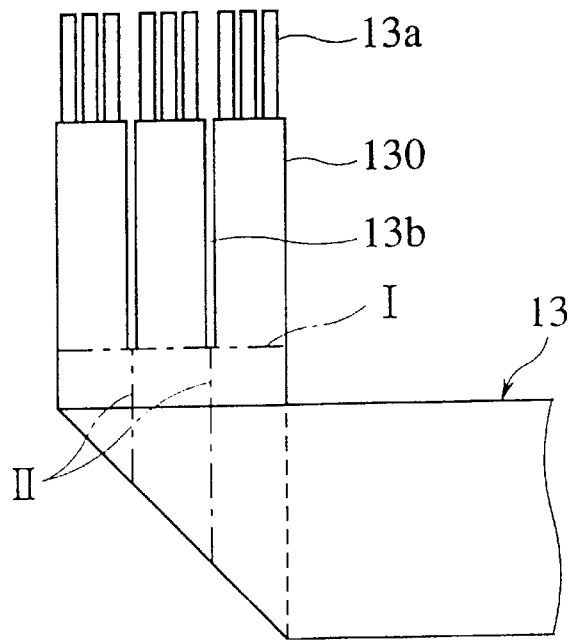
FIG. 3 is a diagram for showing a main portion of the cable of the relaying device for relatively rotatable members of the first embodiment.

The cable 13 comprises a wide and flat-shaped material having a plurality of conductors 13a laid out in parallel, as shown in FIG. 2 and FIG. 3. A portion bent in a 45 degree angle at one end section side enters the groove 110b of the inside cylindrical section 110 and a portion at its front end side extends toward the outside (the upper cover 111 side) from the groove 110b in the axial direction of the inside cylindrical section.

Further, the cable 13 has the portion extending out from the groove 110b of the inside cylindrical section 110 divided into groups, each having a predetermined number of conductors 13a, by slits 13b extending in its longitudinal direction, forming small-width cables 130.

Each small-width cable 130 is bent at a right angle along an I line which is orthogonal with respect to the base section of each slit 13b. In other words, each small-width cable 130 is bent at a right angle toward the outside in the radial direction of the inside cylindrical section 110, as shown in FIG. 2.

Further, the cable 13 is bent at a predetermined angle along each II line on the extension line of each slit 13b, as shown in FIG. 3, so that the cable 13 is accommodated in the groove 110b formed in an arc shape.

The front end section of each small-width cable 130 is provided with a connector 16 as shown in FIG. 1. The connector 16 is structured by insert-forming a resin connection section 15 around a bus bar 14 connected to each conductor 13a.

A portion of each bus bar 14 extending out from the connection section 15 becomes a terminal of each connector 16.

The upper cover 111 is provided with a through-hole 111b at its center section. The upper cover 111 is provided with connector housing sections 111c for holding each connector 16. Each connector 16 is inserted into each corresponding connector housing section 111c from below the upper cover 111 and is engaged to be locked (hereinafter to be called lock engagement).

Although the connector 16 is structured by insert-forming the connection section 15, it may also be structured by securing the surrounding area of the bus bar 14 with a suitable cover.

Further, a connector 19 is provided at the other end section of the cable 13, and the connector 19 is structured by insert-forming a resin connection section 18, around a bus bar 17 connected to each conductor 13a. A portion of each bus bar 17 extending out from the connection section 18 becomes a terminal of the connector 19. The connector 19 is inserted in a connector housing section 12a provided on the outer periphery of the fixed unit 12 and is engaged by lock engagement.

In the relaying device between relatively rotatable members 1 having the above-described structure, the inside cylindrical section 110 is engaged from below an under cover 12b of the fixed unit 12 and, further, the cable 13 is set.

In this case, the connector 16 is inserted from the lower side of the connector housing section 111c and is engaged by lock engagement, and the connector 19 is engaged by lock engagement to the connector housing section 12a.

Then, the upper cover 111 is engaged by locking to the inside cylindrical section 110 via the engagement claw 111a.

When the number of the conductors 13a becomes larger, the cable 13 needs to have a larger width and, therefore, the groove 110b provided in the inside cylindrical section 110 needs to be formed in an arc shape along the outer peripheral surface and the inner peripheral surface. Thus, the groove 110b is bent in an arc shape in the present embodiment as well.

Accordingly, since the cable 13 which extends out from the groove 110b becomes an arc shape in a typical case, this cable 13 can be hardly bent to the outside in its radial direction.

However, in this embodiment, since the cable 13 is divided into small-width cables 130 by the slits 13b, each small-width cable 130 can be bent to the outside in the radial direction, while each small-width cable 130 is maintained in a flat shape by bending the cable 13 along the 11 line, which is the extension line of each slit 13b.

Further, since the cable 13 is divided into groups, each having a predetermined number of the conductors 13a, by the slits 13b, each conductor 13a can be connected to the bus bar 14 of the connector 16 for each divided small-width cable 130.

Accordingly, even in the case where a cable 13 having a large number of the conductors 13a is used, the small connector 16 can be used for connecting the rotary unit 11 side to the cable 13.

In other words, since the cable 13 can be bent easily for each small-width cable 130, divided by the slits 13b, even in the case where the bus bar 14 is disposed in each conductor 13a of the cable 13 to structure the connector 16 using this bus bar 14 as a terminal, there is a connector 16 for each small-width cable 130 and, therefore, there is no large-width connector.

Accordingly, each connector 16 can be laid out easily on the upper cover 111. In the present embodiment, it is of course not necessary to have a structure having two rows of terminals in one connector, and it is not necessary to have a structure of having two rows for one bus bar.

Further, since each small-width cable 130 is bent to the outside in the radial direction, the connector 16, to be connected to each small-width cable 130, and the connector housing 111c, for accommodating the connector 16, can be laid out in a radial shape. Therefore, together with the small sizing of the connector 16, the whole structure of the relaying device between the relatively rotatable members 1 of this embodiment can also be made smaller.

When the relaying device between relatively rotatable members 1 of this embodiment is to be used for a steering section of an automobile, for example, the rotary unit 11 is connected to the steering wheel and the fixed unit 12 is connected to the steering column at the body work side. Then, one end section side of the cable 13 is connected to a wiring at the steering wheel side through a connector or the like, and the other end section side of the cable 13 is connected to a wiring at the body work side through the connector or the like.

Next, a second embodiment of the present invention will be explained with reference to FIGS. 4 and 5.

The elements that are common to the structural elements of the first embodiment have the same reference numerals and their explanation will be omitted.

Characteristic points in which the present embodiment is different from the first embodiment include the addition of an electric wire 20 that is connected directly to each conductor 13a of the cable and the fact that the structure of the connector housing section 111c is different.

Figure 5:
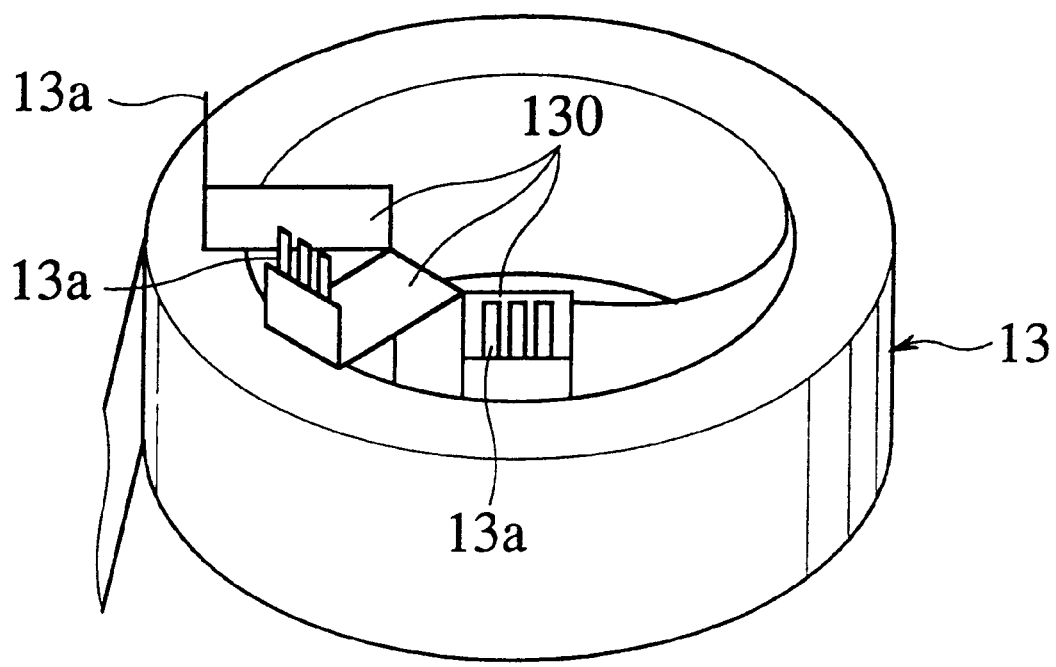
FIG. 5 is a diagram for showing a main portion of the cable of this relaying device for relatively rotatable members of the second embodiment.

In other words, as shown in FIG. 5, each small-width cable 130 is bent at a right angle toward the outside in the radial direction and is further bent at a right angle upwards in the axial direction of the inside cylindrical section 110.

Figure 4:
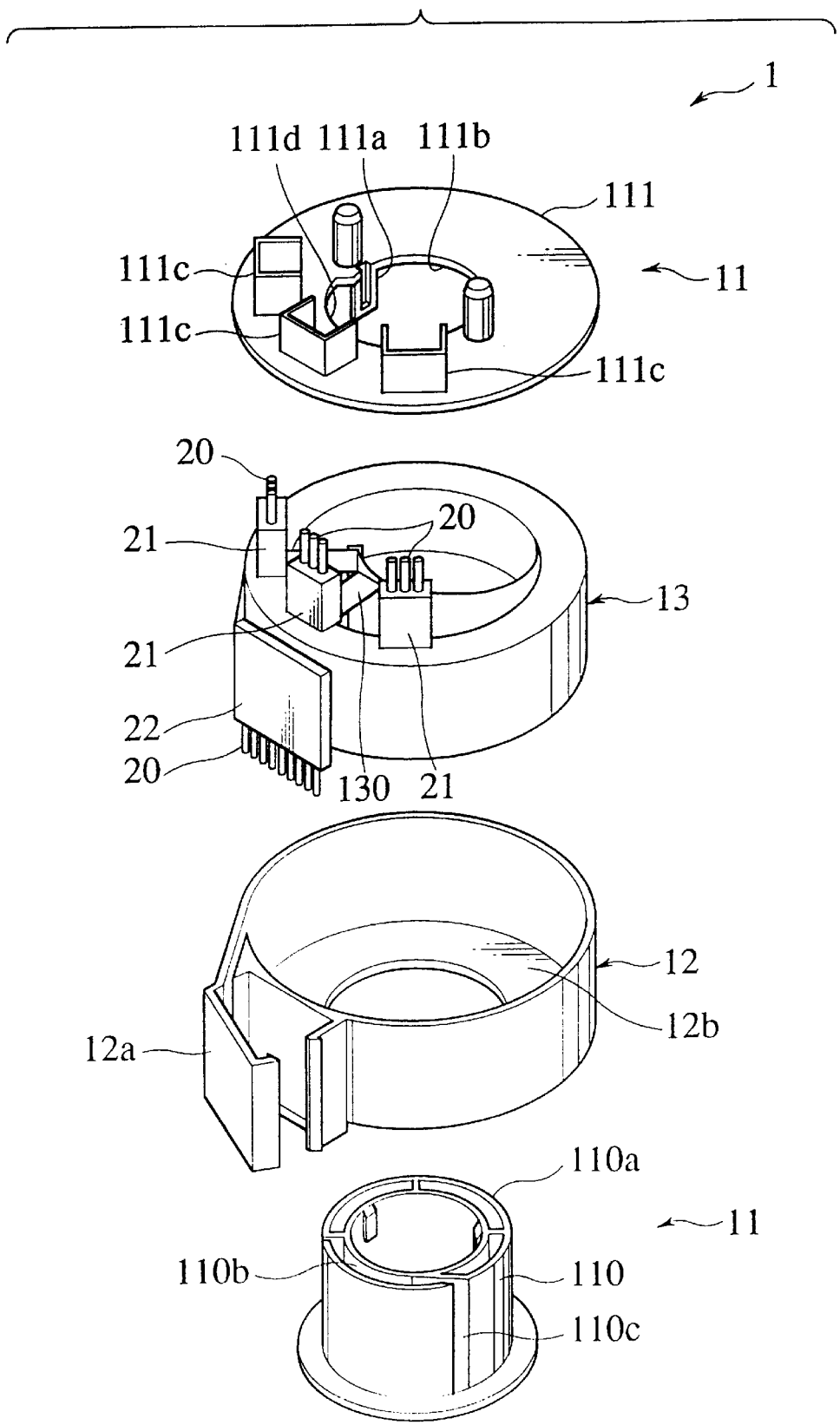
FIG. 4 is a breakdown perspective view of a relaying device for relatively rotatable members shown as a second embodiment of the present invention.

In this embodiment, the electric wire 20 is connected to each conductor 13a and at this connection section, a connection section 21 that functions as a connector is structured by insert-forming as shown in FIG. 4.

Then, the upper cover 111 is provided with each connector housing section 111c for holding each connection section 21.

Each connector housing section 111c has each connection section 21 of each small-width cable 130 that extends out from the upper surface of the upper cover 111, engaged by lock engagement.

Further, the upper cover 111 is formed with a recess 111d for drawing out the small-width cable 130, at a portion corresponding to each connector housing section 111c of the through-hole 111b.

On the other hand, at the other end side of the cable 13, the electric wire 20 is connected directly to each conductor 13a, and a connection section 22 that functions as a connector is insert formed at this connection section.

Then, the connection section 22 is engaged by lock engagement to the connector housing section 12a provided on the outer periphery of the fixed unit 12. The connector housing section 12a is opened and closed by a hinge, and the connection section 22 is engaged by lock engagement when the connector housing section 12a is closed.

In the relaying device between relatively rotatable members of the second embodiment having the above-described structure, each small-width cable 130 can be bent to the outside in the radial direction and can be further bent in the upward direction.

Further, since the cable 13 is divided into groups, each having a predetermined number of conductors 13a, by the slits 13b, each conductor 13a can be connected to the electric wire 20 for each divided small-width cable 130.

Accordingly, even in the case where a cable 13 having a large number of the conductors 13a is used, the small connection section 21 can be used for connecting the rotary unit 11 side to the cable 13.

In other words, since the cable 13 can be bent easily for each small-width cable 130 divided by the slits 13b, the connection section 21, which is structured by disposing the electric wire 20 in each conductor 13a of the cable 13, can become the connection section 21 for each small-width cable 130 and does not become a large-width connection section.

Accordingly, each connection section 21 can be installed easily on the upper cover 111.

Further, since each small-width cable 130 is bent to the outside in the radial direction, the connection section 21 to be connected to each small-width cable 130 and the housing 111c can be laid out in a radial shape, and the whole structure of the relaying device between relatively rotatable members 1 of the second embodiment can be made smaller and the connection section 21 can be made smaller.

What is claimed is:

1. A conduction device, comprising:
    a first rotary unit having an inside cylindrical section;
    a second rotary unit for making a relative rotation with respect to said first rotary unit by surrounding the inside cylindrical section of the first rotary unit; and
    a cable electrically connected to a side of the first rotary unit and a side of the second rotary unit,
    wherein the cable comprises a wide and flat material having a plurality of conductors, and
    wherein the inside cylindrical section has a groove section for introducing said cable between an outer peripheral surface of said inside cylindrical section and an inner peripheral surface of said inside cylindrical section from a side of the outer peripheral surface and for guiding out said cable, along an axial direction of said inside cylindrical section, from one end of said inside cylindrical section in the axial direction thereof, at least a portion of said cable extending out from said groove section having cable sections separated, by slits extending in a longitudinal direction of said cable, into separate cable sections, each of said cable sections having a predetermined number of conductors, said slits spreading said cable sections around the circumference of said second rotary unit so that said cable sections conform to the circumference of said second rotary unit.

2. A conduction device according to claim 1, wherein a cover unit extending in said outwardly facing radial direction of said inside cylindrical section is further provided, and on said cover unit, connector housing sections, corresponding to each of said cables sections, are laid out in a radial shape in said radial direction of said inside cylindrical section.

3. A conduction device according to claim 1, wherein said groove section of said inside cylindrical section has an arc shape.

4. A conduction device according to claim 1, wherein each of said cable sections is bent in an outwardly facing radial direction of said inside cylindrical section.

5. A conduction device according to claim 4, wherein a bus bar is connected to a conductor of each of said cable sections bent in said outwardly facing radial direction of said inside cylindrical section.

6. A conduction device according to claim 5, wherein a connector section is formed around said bus bar and said connector section is laid out in a radial shape in said outwardly facing radial direction of said inside cylindrical section.

7. A conduction device according to claim 1, wherein said cable, divided into cable sections, each having a predetermined number of conductors, is bent in said outwardly facing radial direction of said inside cylindrical section, and is further bent to follow an axial direction of said inside cylindrical section.

8. A conduction device according to claim 7, wherein an electric wire is connected to a conductor connected to said cable bent in said outwardly facing radial direction of said inside cylindrical section, and further bent to follow an axial direction of said inside cylindrical section.

* * * * *

UNITED STATES PATENT AND TRADEMARK OFFICE
CERTIFICATE OF CORRECTION

PATENT NO.   : 6,099,331                                            Page 1 of 1
DATED        : August 8, 2000
INVENTOR(S)  : Tomoyoshi Kikkawa et al.

It is certified that error appears in the above-identified patent and that said Letters Patent is hereby corrected as shown below:

Title Page,
Item [57], in the Abstract, line 7, "Inside" should read -- inside --.

Signed and Sealed this

Fourteenth Day of August, 2001

Attest:

NICHOLAS P. GODICI
*Attesting Officer*       *Acting Director of the United States Patent and Trademark Office*